US012367893B2

(12) United States Patent
Gaba et al.

(10) Patent No.: US 12,367,893 B2
(45) Date of Patent: Jul. 22, 2025

(54) METHOD AND SYSTEM FOR MITIGATING UNWANTED AUDIO NOISE IN A VOICE ASSISTANT-BASED COMMUNICATION ENVIRONMENT

(71) Applicant: Samsung Electronics Co., Ltd., Suwon-si (KR)

(72) Inventors: Abhinav Gaba, Noida (IN); Akul Taneja, Noida (IN); Deepak Sharma, Noida (IN); Raja Singhal, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 136 days.

(21) Appl. No.: 18/084,081

(22) Filed: Dec. 19, 2022

(65) Prior Publication Data

US 2023/0215457 A1 Jul. 6, 2023

(30) Foreign Application Priority Data

Dec. 30, 2021 (IN) ............................ 202111061923

(51) Int. Cl.
*G10L 25/30* (2013.01)
*G10L 21/0208* (2013.01)

(52) U.S. Cl.
CPC .......... *G10L 25/30* (2013.01); *G10L 21/0208* (2013.01); *G10L 2021/02082* (2013.01)

(58) Field of Classification Search
CPC ................. G10L 25/30; G10L 21/0208; G10L 2021/02082
See application file for complete search history.

(56) References Cited

U.S. PATENT DOCUMENTS 8,082,051 B2 * 12/2011 Mihelich ................. H04S 7/307 381/303
9,008,329 B1 * 4/2015 Mandel .................. G10K 15/00 704/226

(Continued)

FOREIGN PATENT DOCUMENTS

IN 202041005143 A 8/2021
KR 10-2254522 B1 5/2021

OTHER PUBLICATIONS

Indian Examination Report dated Dec. 26, 2023, issued in Indian Application No. 202111061923.

(Continued)

*Primary Examiner* — Bhavesh M Mehta
*Assistant Examiner* — Nandini Subramani
(74) *Attorney, Agent, or Firm* — Jefferson IP Law, LLP

(57) ABSTRACT

A method for mitigating unwanted audio noise in internet of things (IoT) based communication environment is provided. The method includes identifying and pairing one or more IoT devices with a voice assistant device, and then dividing the one or more paired IoT devices into a plurality of clusters. The method further includes detecting a user's location with respect to a location of the voice assistant device and then determining a cluster among the plurality of clusters corresponding to the user's location based on the detected user's location and thereafter using a recurrent neural networks (RNN) model, predicting an optimal sound output of the voice assistance device that is audible at the detected user's location. The method furthermore includes correcting the predicted optimal sound output of the voice assistance device using a sound parameter value associated with the determined cluster and a phase shift of the predicted optimal sound output.

12 Claims, 11 Drawing Sheets

(56) References Cited

U.S. PATENT DOCUMENTS

| | | | | |
|---|---|---|---|---|
| 9,391,579 | B2 * | 7/2016 | Walsh | H03G 9/005 |
| 9,706,296 | B2 * | 7/2017 | Uhle | G10K 11/17837 |
| 10,325,585 | B2 | 6/2019 | Baker et al. | |
| 10,506,341 | B2 * | 12/2019 | Bromwich | H03G 3/32 |
| 10,728,662 | B2 * | 7/2020 | Davis | H04R 3/04 |
| 10,878,812 | B1 | 12/2020 | Helwani et al. | |
| 11,900,016 | B2 * | 2/2024 | Denton | H04R 27/00 |
| 12,243,548 | B2 * | 3/2025 | Jancovich | G06F 3/165 |
| 2013/0251079 | A1 * | 9/2013 | Miyahara | G10L 21/0208 375/346 |
| 2016/0364963 | A1 * | 12/2016 | Matsuoka | G06V 10/764 |
| 2017/0372725 | A1 | 12/2017 | Khoury et al. | |
| 2019/0273996 | A1 | 9/2019 | Starobin et al. | |
| 2020/0072937 | A1 * | 3/2020 | Baek | H04R 1/406 |
| 2021/0110826 | A1 | 4/2021 | Lambourne et al. | |
| 2021/0327449 | A1 | 10/2021 | Shin et al. | |
| 2022/0406326 | A1 * | 12/2022 | Port | H04S 7/305 |
| 2023/0385017 | A1 * | 11/2023 | Soto | G06F 3/165 |

OTHER PUBLICATIONS

Indian Hearing Notice dated May 14, 2025, issued in Indian Application No. 202111061923.

* cited by examiner

180° phase shift of sound parameters

1000

METHOD AND SYSTEM FOR MITIGATING UNWANTED AUDIO NOISE IN A VOICE ASSISTANT-BASED COMMUNICATION ENVIRONMENT

CROSS-REFERENCE TO RELATED APPLICATION(S)

This application is based on and claims priority under 35 U.S.C. § 119(a) of an Indian patent application number 202111061923, filed on Dec. 30, 2021, in the Indian Intellectual Property Office, the disclosure of which is incorporated by reference herein in its entirety.

BACKGROUND

1. Field

The disclosure relates to a method and system for mitigating unwanted audio noise. More particularly, the disclosure relates to a method and system for mitigating unwanted audio noise in a voice assistant-based communication environment.

2. Description of Related Art

With the rapid growth in speech recognition and speech response-based systems, an exploration into human interaction with Artificial Intelligence (AI) based voice systems has become an integral part of livelihood and has drawn significant consideration of the users for a better interactive experience. For example, voice assistants have become an integral part of home and office environments nowadays, There are many reasons due to which speech recognition or the speech response by the AI-based voice systems fail in the case of a noisy environment.

In an ideal scenario, in a room or hall with no activity, the voice responses from the voice assistants would be clearly audible to users. However, it is very rare to have an interaction with a voice assistant that doesn't have some form of background noise. For example, the user could be in a home with multiple noise elements present in the background, or the user could be at a quick-service restaurant with other customers' chatter, etc. whatever the background noise is, a voice assistant needs to be able to filter through it and focus on the person asking the question and respond that accordingly. Otherwise, the voice assistant will lose its accuracy. For example, the voice assistant might provide false positives and negative responses, and might create frustration for the user. Generally, the voice assistant brings a whole new hands-free experience of asking questions, requests, or giving tasks and that is why it needs to be accurate. Therefore, the voice responses from these devices need to be loud and clear.

Elements of the noisy environment like additive noise, convolutional noise, nonlinear distortion, etc. in the AI-based voice systems are not easy to correct and not all solutions work for each type of noise interference. For example, there is noise or some background sound in rooms and offices where different kinds of activities are ongoing. An example of such an environment is also shown in FIG. 1 of the drawings. These noises and the background sound in the room and offices make it difficult for the user of the voice assistant to be able to understand or listen to the audio response provided by the voice assistant. In general, noise is very difficult for AI-based voice systems to handle and requires various reduction methods.

Therefore, there lies a need for a method and system that can mitigate unwanted audio noise in such environments as discussed above. Accordingly, the disclosure describes the method and the system for mitigating unwanted audio noise in a voice assistant-based communication environment to provide loud and clear voice responses to the user.

The above information is presented as background information only to assist with an understanding of the disclosure. No determination has been made, and no assertion is made, as to whether any of the above might be applicable as prior art with regard to the disclosure.

SUMMARY

This summary is provided to introduce a selection of concepts in a simplified format that are further described in the detailed description of the disclosure. This summary is not intended to identify key or essential inventive concepts of the disclosure, nor is it intended for determining the scope of the disclosure.

Aspects of the disclosure are to address at least the above-mentioned problems and/or disadvantages and to provide at least the advantages described below. Accordingly, an aspect of the disclosure is to provide a method and system for mitigating unwanted audio noise in a voice assistant-based communication environment.

Additional aspects will be set forth in part in the description which follows and, in part, will be apparent from the description, or may be learned by practice of the presented embodiments.

In accordance with an aspect of the disclosure, a method for mitigating unwanted audio noise in the Internet of things (IoT) based communication environment is provided. The method includes identifying and pairing one or more IoT devices with a voice assistant device in the IoT-based communication environment based on an exchange of information between the one or more IoT devices and the voice assistant device. The method further comprises dividing, using a gaussian mixture model, the one or more paired IoT devices into a plurality of clusters based on location information of the one or more IoT devices that are paired with the voice assistant device. Furthermore, the method comprises detecting a user's location with respect to a location of the voice assistant device based on at least one of sensors data associated with the one or more IoT devices or a time difference between an ultrasonic wave transmitted by the voice assistance device and an echo signal reflected from the user's body in response to the transmitted ultrasonic wave. Subsequent to the detection of the user's location, the method furthermore comprises determining a cluster among the plurality of clusters corresponding to the user's location based on the detected user's location and then using a recurrent neural networks (RNN) model predicting an optimal sound output of the voice assistance device that is audible at the detected user's location based on sound information data that includes information corresponding to a current sound output of the voice assistant device, information corresponding to environmental noise associated with the determined cluster, and information corresponding to the perceived sound of the voice assistant device at each IoT device of the one or more IoT devices. At last, after the prediction of the optimal sound output of the voice assistance device, the method furthermore comprises correcting the predicted optimal sound output of the voice assistance device based on a calculation of a sound parameter value corresponding to each of the IoT devices of the determined cluster and a phase shift of the predicted optimal sound output using the calculated sound parameter value.

In accordance with another aspect of the disclosure, a system for mitigating unwanted audio noise in IoT based communication environment is provided. The system includes a pairing module, a clustering module, a prediction module, and a correction module. The pairing module is configured to identify and pair one or more IoT devices with a voice assistant device in the IoT-based communication environment based on an exchange of information between the one or more IoT devices and the voice assistant device. The clustering module is configured to divide, using a gaussian mixture model, the one or more paired IoT devices into a plurality of clusters based on location information of the one or more IoT devices that are paired with the voice assistant device. The clustering module is further configured to detect a user's location with respect to a location of the voice assistant device based on at least one of sensors data associated with the one or more IoT devices or a time difference between an ultrasonic wave transmitted by the voice assistance device and an echo signal reflected from the user's body in response to the transmitted ultrasonic wave. Furthermore, the clustering module is configured to determine a cluster among the plurality of clusters corresponding to the user's location based on the detected user's location. The prediction module is configured to predict, using a recurrent neural networks (RNN) model, an optimal sound output of the voice assistance device that is audible at the detected user's location based on sound information data that includes information corresponding to a current sound output of the voice assistant device, information corresponding to environmental noise information associated with the determined cluster, and information corresponding to the perceived sound of the voice assistant device at each IoT device of the one or more IoT devices. After the prediction of the optimal sound output, the correction module is configured to correct the predicted optimal sound output of the voice assistance device based on a calculation of a sound parameter value corresponding to each of the IoT devices of the determined cluster and a phase shift of the predicted optimal sound output using the calculated sound parameter value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other, aspects, features, and advantages of certain embodiments of the disclosure will be more apparent from the following description taken in conjunction with the accompanying drawings, in which.

Figure 1:
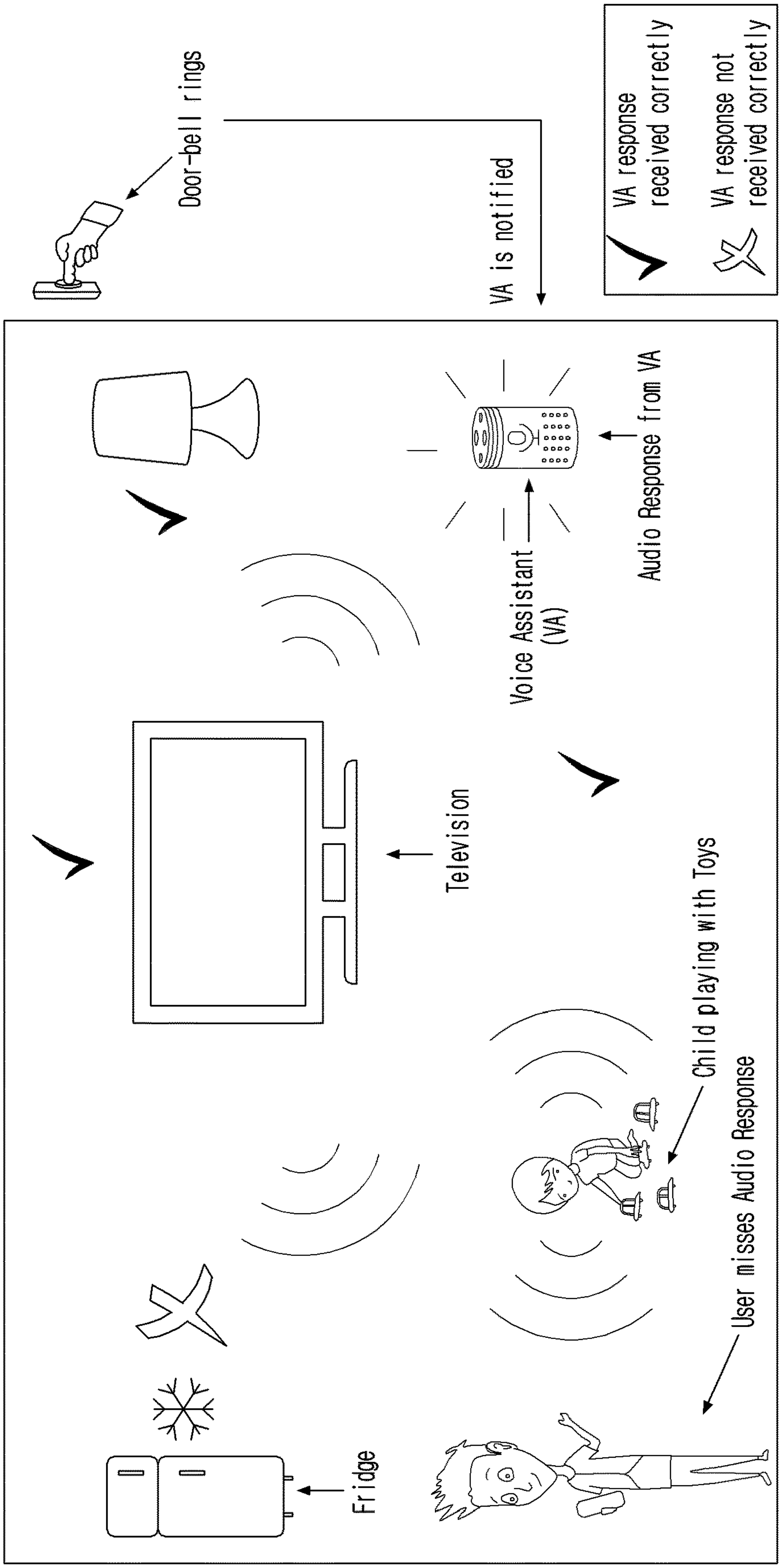
FIG. 1 illustrates an example illustration of problems indicating unwanted noise present in a voice assistance based communication environment, according to the related art.

Further, skilled artisans will appreciate that elements in the drawings are illustrated for simplicity and may not have necessarily been drawn to scale. For example, the flow charts illustrate the method in terms of the most prominent operations involved to help to improve understanding of aspects of the disclosure. Furthermore, in terms of the construction of the device, one or more components of the device may have been represented in the drawings by symbols, according to the related art, and the drawings may show only those specific details that are pertinent to understanding the embodiments of the disclosure so as not to obscure the drawings with details that will be readily apparent to those of ordinary skill in the art having the benefit of the description herein.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or one embodiment or several embodiments or all embodiments. Accordingly, the term "some embodiments" is defined as meaning "no embodiment, or one embodiment, or more than one embodiment, or all embodiments."

The terminology and structure employed herein is for describing, teaching, and illuminating some embodiments and their specific features and elements and does not limit, restrict, or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and must NOT be taken to exclude the possible removal of one or more of the listed features and elements, unless otherwise stated with the limiting language "MUST comprise" or "NEEDS TO include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do NOT preclude there being none of that feature or element unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having ordinary skill in the art.

Embodiments of the disclosure will be described below in detail with reference to the accompanying drawings.

Figure 2:
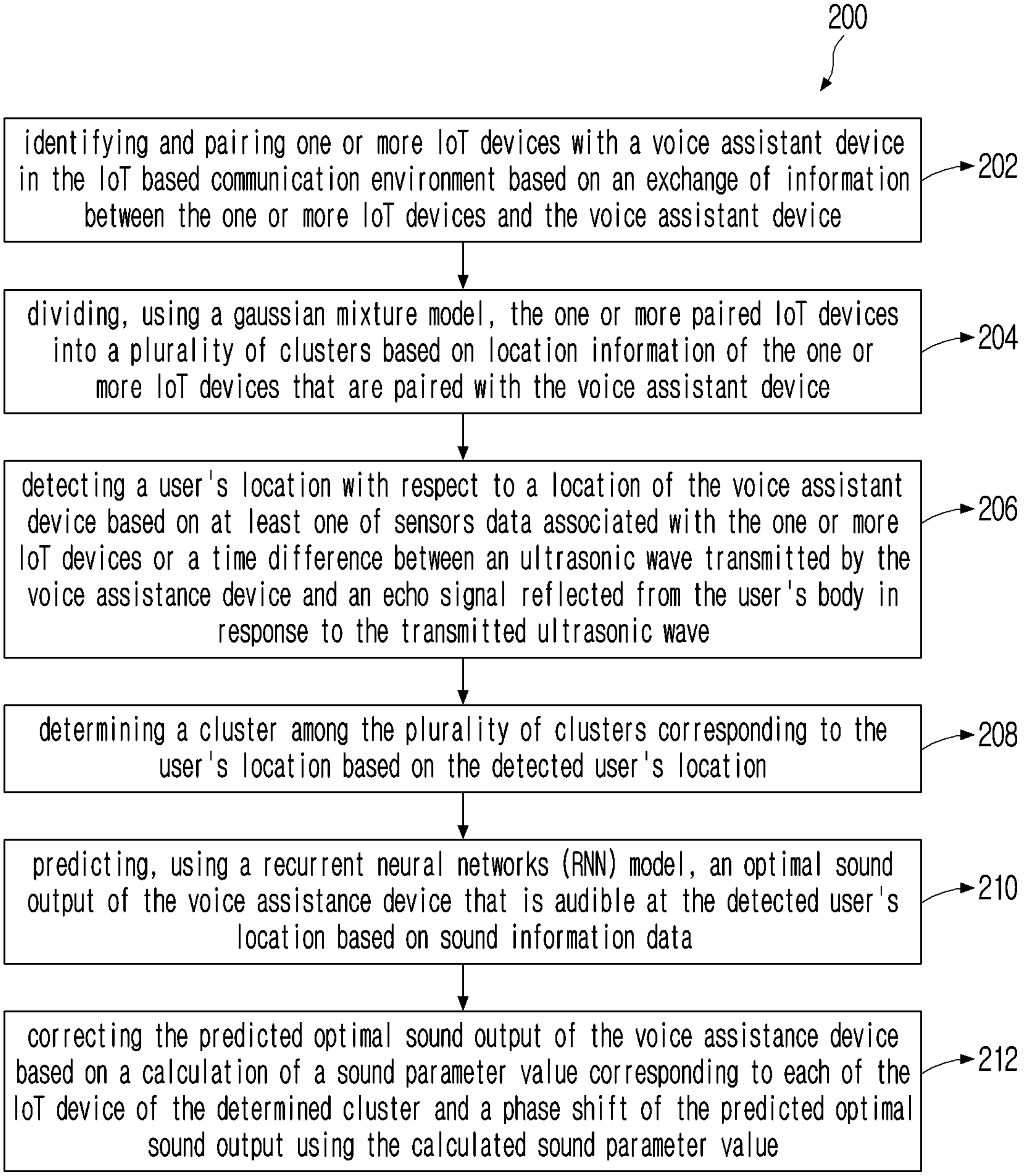
FIG. 2 illustrates a flowchart of method operations for mitigating unwanted audio noise in the IoT based communication environment, according to an embodiment of the disclosure.

FIG. 2 illustrates a flowchart of method operations for mitigating unwanted audio noise in the Internet of Things (IoT)-based communication environment, according to an embodiment of the disclosure.

Figure 3:
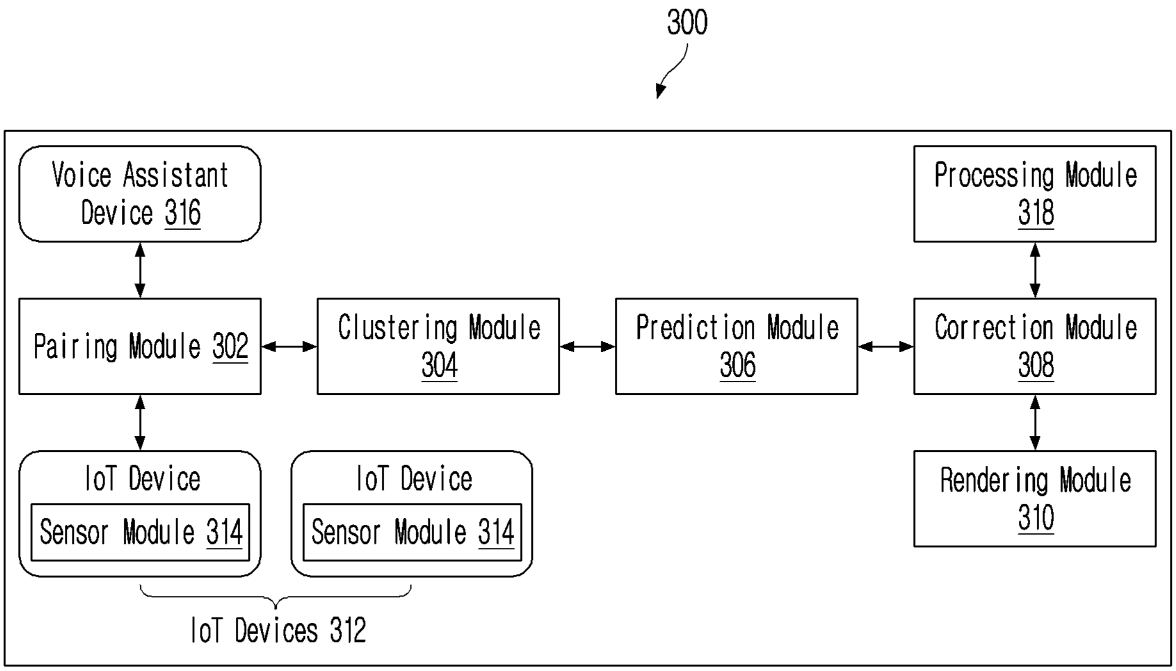
FIG. 3 illustrates a system architecture for mitigating unwanted audio noise in the IoT based communication environment, according to an embodiment of the disclosure.

Referring to FIG. 2, it depicts a method 200 that is executed by components of the system 300 of FIG. 3 of the drawings. FIG. 3 illustrates a system architecture for mitigating unwanted audio noise in the IoT-based communication environment, according to an embodiment of the disclosure.

Referring to FIG. 3, the system 300 includes a pairing module 302, a clustering module 304, a prediction module 306, a correction module 308, a rendering module 310, IoT devices 312 including sensor module 314, a voice assistant device 316, and a processing module 318. The aforementioned components of the system 300 are coupled with each other for transfer of information from one component to the other component in the system 300. It will be understood to a person of ordinary skill in the art that the disclosure is not limited to the architecture described above, the concept of the proposed architecture can be applied to any kind of IoT communication-based architecture supporting the voice assistance feature.

The IoT devices 312 are intended to represent devices with wired or wireless interfaces through which the IoT devices 312 can send and receive data over wired and wireless connections. Examples of IoT devices include, but are not limited to, mobile devices, smart electronic devices, biological managers, sensory devices, functionality performing devices, and the like. The IoT devices 312 can include unique identifiers which can be used in the transmission of data through a network. Unique identifiers of the IoT devices 312 can include identifiers created in accordance with Internet Protocol version 4 (hereinafter referred to as "IPv4") or identifiers created in accordance with Internet Protocol version 6 (hereinafter referred to as "IPv6"), of which both protocol versions are hereby incorporated by reference. Depending upon implementation-specific or other considerations, the IoT devices 312 can include applicable communication interfaces for receiving and sending, data according, to an applicable wireless device protocol. Examples of applicable wireless device protocols include, but are not limited to, Wi-Fi, ZigBee®, Bluetooth®, and other applicable low-power communication standards.

The sensor module 314 included in the IoT devices 312 may include but is not limited to, accelerometer sensor, ultrasonic sensors, gyro sensor, proximity sensor, infrared (IR) sensor, humidity sensor, pressure sensor, level sensor, gas sensor, temperature sensor, motion detection sensor, and the like.

Here a detailed description of the flow of method of the method 200 and functionalities of the components of the system 300 will be made by referring to the voice assistant device 316. However, other smart IoT devices supporting voice assistant features and the like can also be used as reference.

Referring to FIG. 2, the method 200 comprises at operation 202 identifying and pairing one or more IoT devices with a voice assistant device in the IoT-based communication environment based on an exchange of information between the one or more IoT devices and the voice assistant device. As an example, the pairing module 302 identifies the IoT devices 312 in the IoT-based communication environment when the voice assistant device 316 triggers an input event to the pairing module 302 as soon as the voice assistant device is ready in a wireless connection state and operation mode. After the identification of the IoT devices 312, the pairing module 302 pairs the identified IoT devices with the voice assistant device 316 based on an exchange of information between the IoT devices 312 and the voice assistant device 316.

In particular, the pairing module 302 exchanges the information between the IoT devices 312 and the voice assistant device 316 in a pairing mode based on approval of a respective connection request by the IoT devices 312 that is being transmitted by the voice assistant device 316 to the respective IoT devices 312. The exchanged information may include but is not limited to, the location information of the IoT devices 312, the information associated with environmental noise around each IoT device of the IoT devices 312, and the information associated with the perceived sound of the voice assistant device 316 at each IoT device of the IoT devices 312. The pairing module 302 may also update the exchanged information periodically based on a change in the wireless connection states of the IoT devices 312 with the voice assistant device 316. The flow of the method 200 now proceeds to operation 204.

Figure 4:
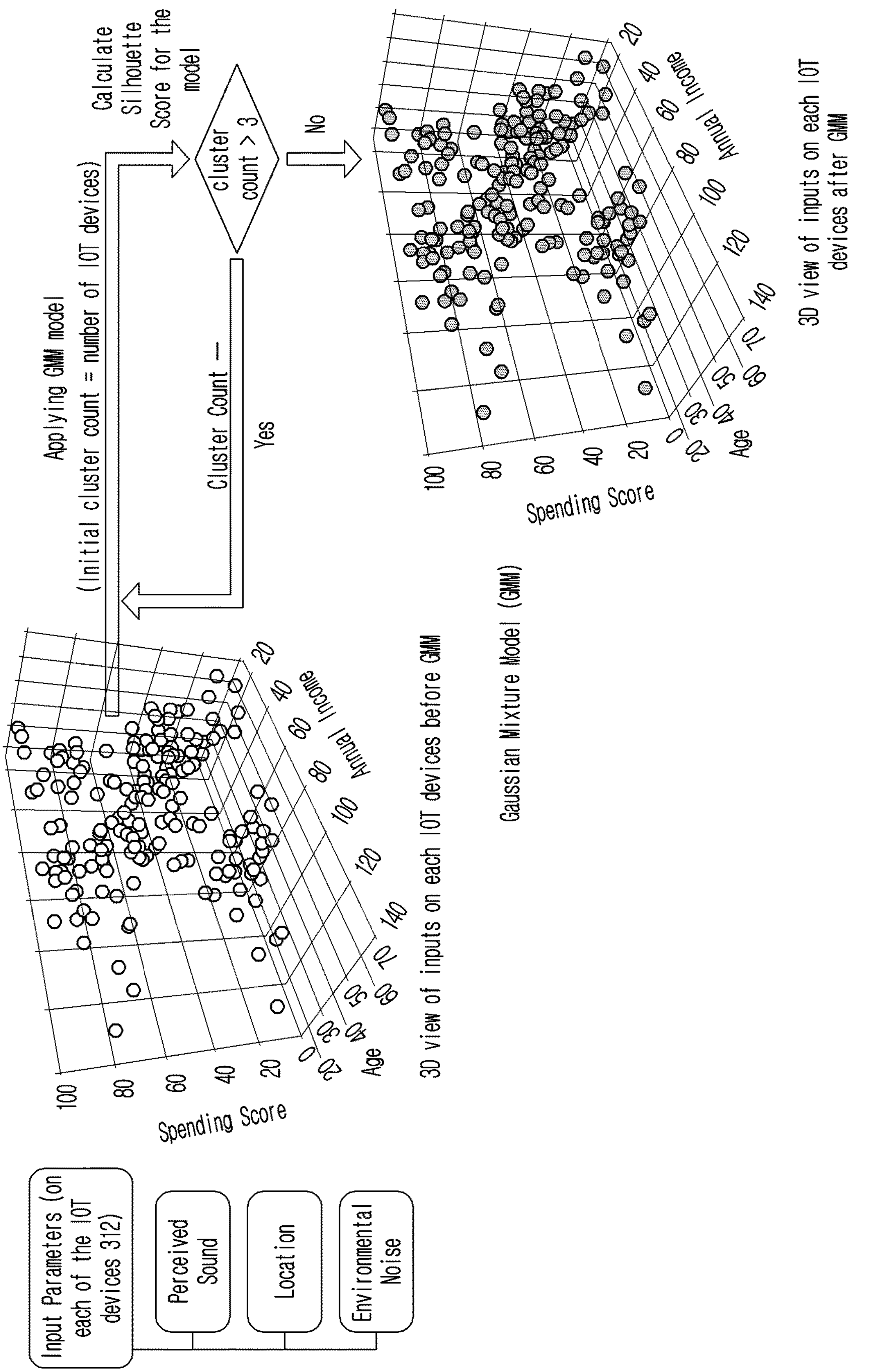
FIG. 4 illustrates an example illustration of the gaussian mixture model (GMM), according to an embodiment of the disclosure.
Figure 5:
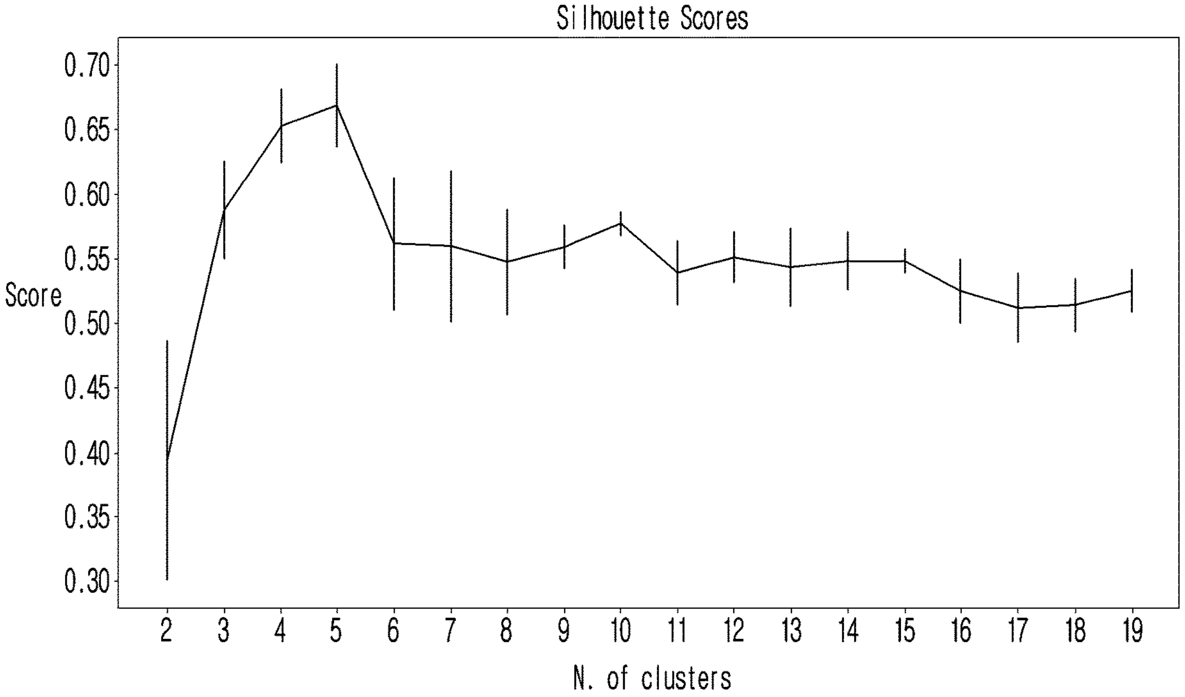
FIG. 5 illustrates a graphical representation indicating maximum silhouette score for the selection of the number of clusters, according to an embodiment of the disclosure.

At operation 204, subsequent to the pairing of the IoT devices 312 with the voice assistant device 316, the method 200 comprises dividing, using a gaussian mixture model, the one or more paired IoT devices into a plurality of clusters based on location information of the one or more IoT devices that are paired with the voice assistant device. For ease of explanation, an example illustration of the gaussian mixture model is also shown in FIG. 4 of the drawings, according to an embodiment of the disclosure. As an example, the clustering module 304 divides the IoT devices 312 that are paired with the voice assistant device 316 into a plurality of clusters based on the location information of the IoT devices 312. Initially, the clustering module 304 applies the gaussian mixture model on a dataset for a different range of cluster count and then further selects a number of clusters for which silhouette score is maximum. A graphical representation indicating maximum silhouette score for the selection of the number of clusters is illustrated in FIG. 5 of the drawings, according an embodiment of the disclosure. Here, each cluster of the plurality of clusters includes at least one IoT device. The flow of the method 200 now proceeds to operation 206.

Figure 6:
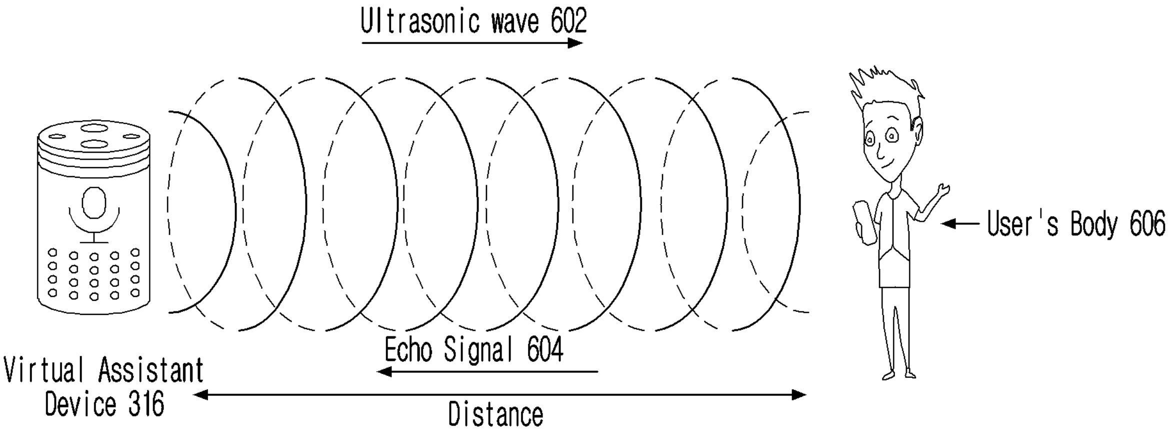
FIG. 6 illustrates an example illustration of sonar technology using the ultrasonic wave and the echo signal for the detection of the user's location with respect to the voice assistant device, according to an embodiment of the disclosure.

At operation 206, after the division of the one or more paired IoT devices into the plurality of clusters, the method 200 comprises detecting a user's location with respect to a location of the voice assistant device based on at least one of sensors data associated with the one or more IoT devices or a time difference between an ultrasonic wave transmitted by the voice assistance device and an echo signal reflected from the user's body in response to the transmitted ultrasonic wave. As an example, after dividing the IoT devices 312 into the plurality of clusters, the clustering module 304 further detects a location of the user with respect to a location of the voice assistant device 316 based on at least one of sensors data collected by the respective sensor modules 314 of the IoT devices 312 or the time difference between the ultrasonic wave 602 transmitted by the voice assistance device 316 and an echo signal 604 reflected from the user's body 606 in response to the transmitted ultrasonic wave 602. In particular, the clustering module 304 identifies the user's location with the help of sonar technology and classify the user as part of one of the clusters among the plurality of cluster. An example illustration of the sonar technology using the ultrasonic wave and the echo signal is shown in FIG. 6 of the drawings, according to an embodiment of the disclosure. The flow of the method 200 now proceeds to operation 208.

At operation 208, after the detection of the user's location, the method 200 comprises determining a cluster among the plurality of clusters corresponding to the user's location based on the detected user's location. As an example, after detecting the user's location, the clustering module 304 furthermore determines a cluster among the plurality of clusters corresponding to the user's location based on the detected user's location. The flow of the method 200 now proceeds to operation 210.

Once the process of clustering module 304 is completed and the output generated by clustering module 304 acts as an input to the prediction module 306, and accordingly at operation 210, the method 200 comprises predicting, using a recurrent neural networks (RNN) model, an optimal sound output of the voice assistance device that is audible at the detected user's location based on sound information data. As an example, the prediction module 306 predicts, using the RNN model, an optimal sound output of the voice assistance device 316 that is audible at the detected user's location based on the sound information data. The sound information data includes at least one of information corresponding to a current sound output of the voice assistant device, information corresponding to environmental noise associated with the determined cluster, and information corresponding to the perceived sound of the voice assistant device at each IoT device of the one or more IoT devices. In particular, the sound information data includes an original sound output of the voice assistant device 316, the environmental noise information associated with the determined cluster in which the user is present, and the information related to the perceived sound of the voice assistant device 316 at each IoT device among the IoT devices 312. Further, the predicted optimal sound output of the voice assistance device 316 includes a plurality of acoustic parameters (Frequency parameters and intensity parameters). The first set of acoustic parameters among the plurality of acoustic parameters corresponds to frequency parameters including minimum frequency level, maximum frequency level, and mean frequency level ($f_{min}$, $f_{max}$, and $f_{mid}$) of the predicted optimal sound output, and the second set of acoustic parameters among the plurality of acoustic parameters corresponds to intensity parameters including minimum intensity level, maximum intensity level, and mean intensity level ($I_{min}$, $I_{max}$, and $I_{mid}$) of the predicted optimal sound output.

In particular, the output of the RNN is the predicted sound at the detected user's location, which can be denoted as 6 acoustic parameters such as:

Frequency parameters: $f_{min}$, $f_{max}$, $f_{mid}$

Intensity parameters: $I_{min}$, $I_{max}$, $I_{mid}$

Figure 7:
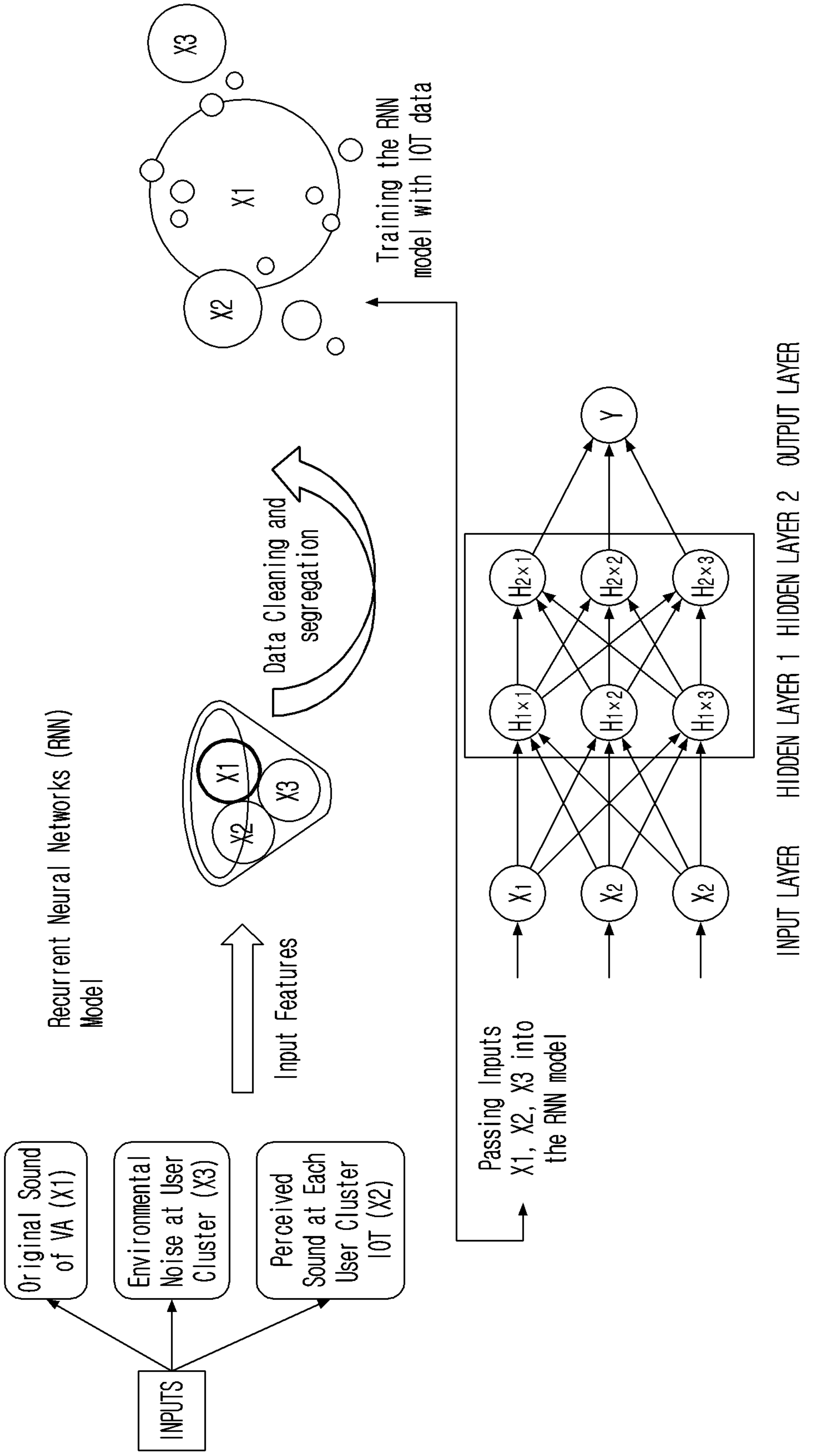
FIG. 7 illustrates a prediction method involved in the prediction of the optimal sound at the detected user's location, according to an embodiment of the disclosure.

For ease of explanation, the operations involved in the prediction of the optimal sound at the detected user's location is shown in FIG. 7 of the drawings, according to an embodiment of the disclosure. The Output Y as shown in FIG. 7 denotes the predicted optimal sound at the detected user's location that can be denoted as 6 acoustic parameters as described above. The flow of the method 200 now proceeds to operation 212.

Once the process of the prediction module 306 is completed, the output generated by the prediction module 306 acts as an input to the correction module 308, and accordingly at operation 212, the method 200 comprises correcting the predicted optimal sound output of the voice assistance device based on a calculation of a sound parameter value corresponding to each of the IoT device of the determined cluster and a phase shift of the predicted optimal sound output using the calculated sound parameter value. As an example, the correction module 308 corrects the predicted optimal sound output of the voice assistance device 316. For correcting the predicted optimal sound output of the voice assistance device 316, the correction module 308 performs a series of operations described below.

Initially, the correction module 308 calculates the sound parameter value (Δ) corresponding to each of the IoT devices of the determined cluster in which the user is present. In order to calculate the sound parameter value, the correction module 308 performs a series of sub-operations such as, combining the first set of acoustic parameters ($\Delta_f = f_{min}, f_{max}, f_{mid}$) with the second set of acoustic parameters ($\Delta_I = I_{min}, I_{max}, I_{mid}$) based on frequency bands of an audible range (for example, 20 Hz-20 kHz) and then calculates the sound parameter value ($\Delta = \Delta_f + \Delta_I$) by adding or combining the parameter values of the first set of acoustic parameters with the parameter values of the second set of acoustic parameters. Here, both parameter values $\Delta_f$ and $\Delta_I$ correspond to independent variables.

Figure 8:
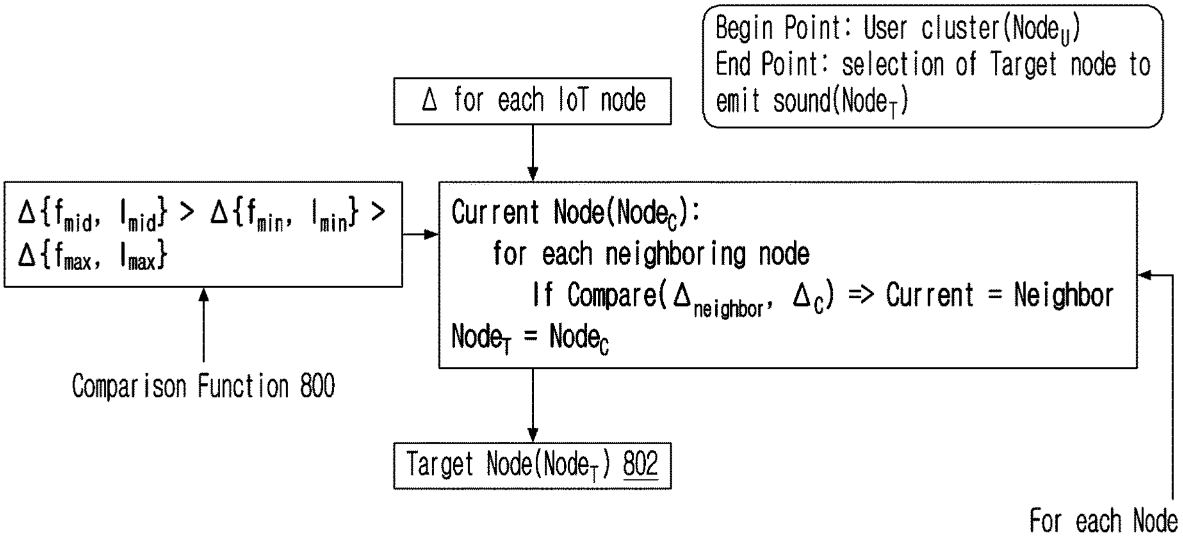
FIG. 8 illustrates a process of comparison for the selection of the target IoT node, according to an embodiment of the disclosure.

Once the sound parameter value is calculated by the correction module 308 then the correction module 308 selects, as a target IoT device, an IoT device that has a minimum sound parameter value from the determined cluster in which the user is present. In particular, the correction module 308 compares the functional values (comparison function 800) of the combinations of the acoustic parameters for each neighboring IoT node with the current IoT node (i.e., the IoT node with the Ideal sound which needs to be heard in the user cluster) and selects a target IoT Node 802 on the basis of a result of the comparison indicating an IoT node with the minimum difference. Here, during the comparison, mid-range frequencies have been given a higher priority because they are most audible by humans and then the minimum range frequencies have been prioritized because they are most susceptible to loss. Accordingly, the target IoT node 802 is selected on the basis of least delta (i.e., sound parameter value Δ) from it to the determined cluster in which the user is present. An example illustration of the basis of comparison for the selection of the target IoT node is shown in FIG. 8 of the drawings, according to an embodiment of the disclosure.

Figure 9:
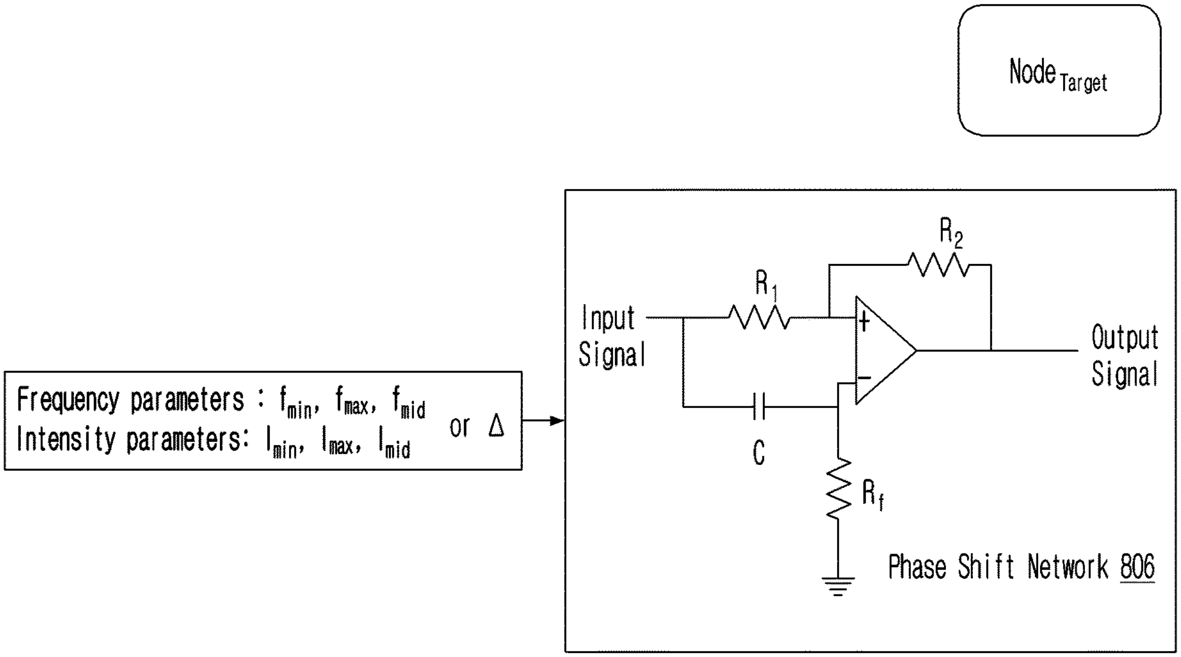
FIG. 9 illustrates a phase shift network for shifting the phase of the predicted optimal sound output, according to an embodiment of the disclosure.

Once the target IoT node (Target IoT device among the determined user cluster) is selected by the correction module 308 then the correction module 308 perform a shifting operation for shifting a phase of the predicted optimal sound output based on the sound parameter value (Δ) and the sound parameters of the selected IoT device (i.e., sound parameters of the target IoT device). As an example, the correction module 308 shifts the phase of the predicted optimal sound output by 180° based on A parameters (acoustic parameters) of the selected target IoT device using a phase shift network 806 as shown in FIG. 9 of the drawings, according to an embodiment of the disclosure. The shifting in the phase of the predicted optimal sound output ensures destructive interference with noise.

Furthermore, in the final operation, after shifting the phase of the predicted optimal sound output, the correction module 308 generates a new optimal sound corresponding to the determined cluster by merging the shifted phase optimal sound output with the desired sound of the voice assistant device 316. As an example, the correction module 308 generates a corrected sound or the ideal sound to be heard at the user's location by merging the shifted phase optimal sound output with the desired sound of the voice assistant device 316.

When the new optimal sound or the corrected sound is generated by the correction module 308, then the rendering module 310 of the system 300 emits or outputs the generated new optimal sound from the selected target IoT device that can be heard clearly at the user location despite the adverse effect of the unwanted noise in the environment or surroundings around the user.

According to one embodiment of the disclosure, the processing module 318 of the system 300 determines, based on the corrected optimal sound output of the voice assistance device 316, an optimal region in the determined cluster in which the user is present or around the determined cluster where the generated new optimal sound is audible and accordingly updates settings of the voice assistance device 316 based on the determined optimal region in order to accurately provide loud and clear voice response to the user.

Now some specific use case examples of the disclosure will be described in accordance with an embodiment of the disclosure.

The method 200 and the system 300 of the disclosure can be used in IoT-based Home Automation solutions. Many times, in an event-triggered communication between the voice assistant device and a human, when the voice assistant (VA) device utters some message for the user but due to the noisy environment there is no feedback if the user gets the message uttered by the voice assistant device or not. In other words, since the user is not aware that the voice assistant device is speaking information to the user, the user never gets that information. In view of such a situation, the method 200 and the system 300 of the disclosure can generate an enhanced modulated sound which if transmitted from IoT devices will reach to the user with minimized signal to noise ratio (SNR). Those skilled in the art will appreciate that the aforementioned example is merely exemplary and is not intended to limit the scope of the invention.

The method 400 and the system 500 of the disclosure can also be used in the case of industrial automation based IoT solutions to mitigate the unwanted noise from a noisy environment and in order to generate the enhanced modulated sound which if transmitted from IoT devices will reach to the user or other IoT devices with minimized SNR. Those skilled in the art will appreciate that the aforementioned example is merely exemplary and is not intended to limit the scope of the invention.

Figure 10:
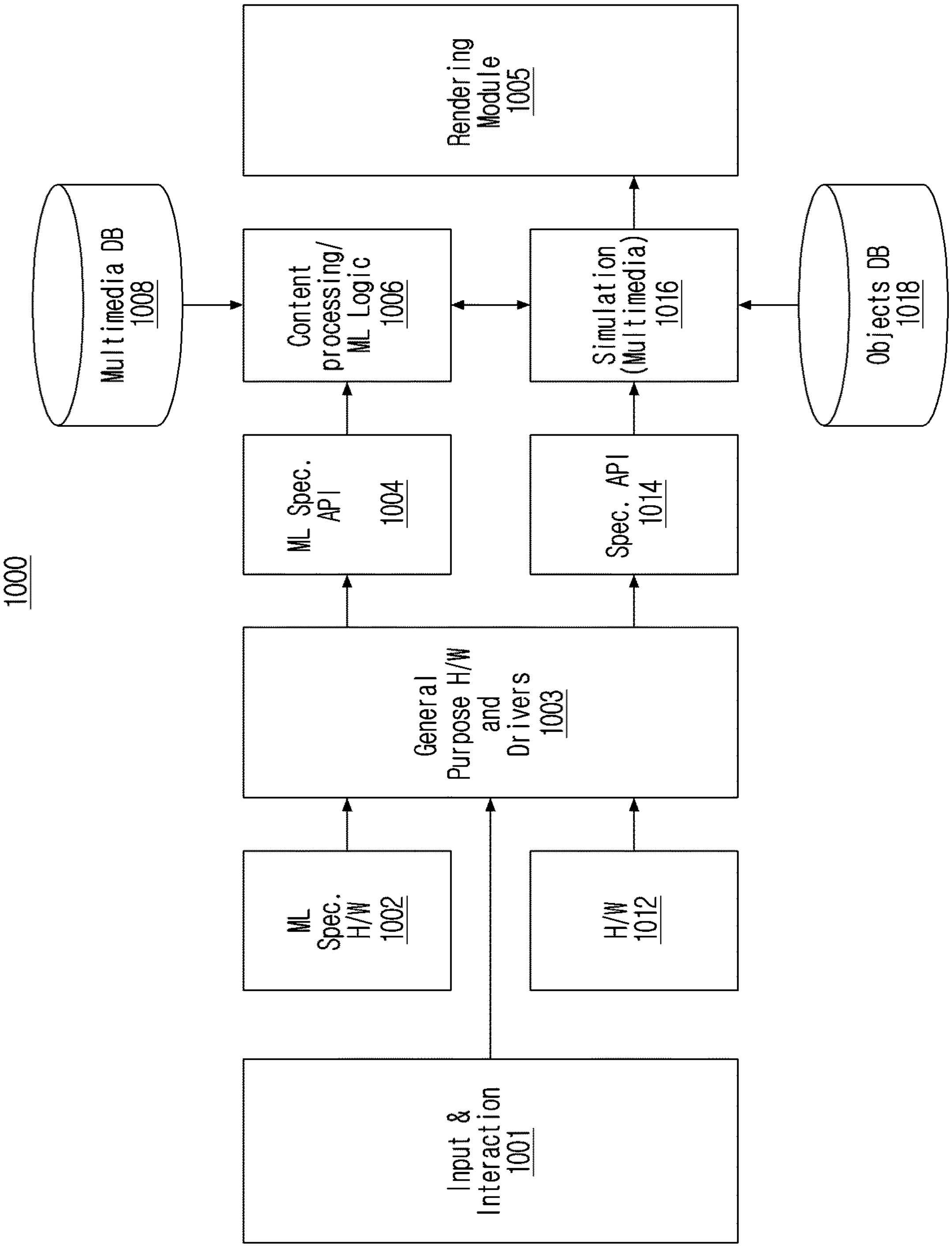
FIG. 10 illustrates a representative architecture to provide tools and development environment described herein for a technical realization of the system 300, according to an embodiment of the disclosure.

Referring now to FIG. 10 of the drawings, it illustrates a representative architecture to provide tools and development environment described herein for a technical realization of the system 300, according to an embodiment of the disclosure. FIG. 10 is merely a non-limiting example, and it will be appreciated that many other architectures may be implemented to facilitate the functionality described herein. The architecture may be executing on hardware such as a computing machine (or system) 1000 of FIG. 10 that includes, among other things, processors, memory, and various application-specific hardware components.

The architecture (or system) 1000 may include an operating system, libraries, frameworks, or middleware. The operating system may manage hardware resources and provide common services. The operating system may include, for example, a kernel, services, and drivers defining a hardware interface layer. The drivers may be responsible for controlling or interfacing with the underlying hardware. For instance, the drivers may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

A hardware interface layer includes libraries which may include system libraries such as file-system (e.g., C standard library) that may provide functions such as memory allocation functions, string manipulation functions, mathematic functions, and the like. In addition, the libraries may include application programming interface (API) libraries such as audio-visual media libraries (e.g., multimedia data libraries to support presentation and manipulation of various media formats such as moving picture experts group 4 (MPEG4), H.264, MPEG audio layer 3 (MP3), advanced audio coding (AAC), adaptive multi rate (AMR), joint photographic expert group (JPG), portable network graphic (PNG)), database libraries (e.g., SQLite that may provide various relational database functions), web libraries (e.g., WebKit that may provide web browsing functionality), and the like.

A middleware may provide a higher-level common infrastructure such as various graphic user interface (GUI) functions, high-level resource management, high-level location services, and so forth. The middleware may provide a broad spectrum of other APIs that may be utilized by the applications or other software components/modules, some of which may be specific to a particular operating system or platform.

The term "module" or "unit" used in this disclosure may refer to a certain unit that includes one of hardware, software, and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module or the unit disclosed herein may include at least one Application-Specific Integrated Circuit (ASIC) chip, Field-Programmable Gate Arrays (FPGAs), and programmable-logic device, which have been known or are to be developed.

Further, the architecture 1000 depicts an aggregation of audio/video processing device-based mechanisms and machine learning/natural language processing (ML/NLP)-based mechanisms in accordance with an embodiment of the subject matter. A user interface is defined as input and interaction 1001 refers to overall input. It can include one or more of the following—touch screen, microphone, camera, etc. A first hardware module 1002 depicts specialized hardware for ML/NLP based mechanisms. As an example, the first hardware module 1002 comprises one or more neural processors, FPGA, digital signal processor (DSP), graphics processing unit (GPU), etc.

A second hardware module 1012 depicts specialized hardware for executing the data splitting and transfer. ML/NLP based frameworks and APIs 1004 correspond to the hardware interface layer for executing the ML/NLP logic 1006 based on the underlying hardware. In an example, the frameworks may be one or more or the following—Tensorflow, Café, NLTK, GenSim, ARM Compute, etc. Simulation frameworks 1016 and APIs 1014 may include one or more of—Audio Core, Audio Kit, Unity, Unreal etc.

A multimedia database (DB) 1008 depicts a pre-trained database. The database 1008 may be remotely accessible through cloud by the ML/NLP logic 1006. In other example, the database 1008 may partly reside on cloud and partly on-device based on usage statistics.

Another database (e.g., an objects DB) 1018 refers the memory. The database 1018 may be remotely accessible through a cloud. In other example, the database 1018 may partly reside on the cloud and partly on-device based on usage statistics.

A rendering module 1005 is provided for rendering audio output and triggering further utility operations. The rendering module 1005 may be manifested as a display cum touch screen, monitor, speaker, projection screen, etc.

Figure 11:
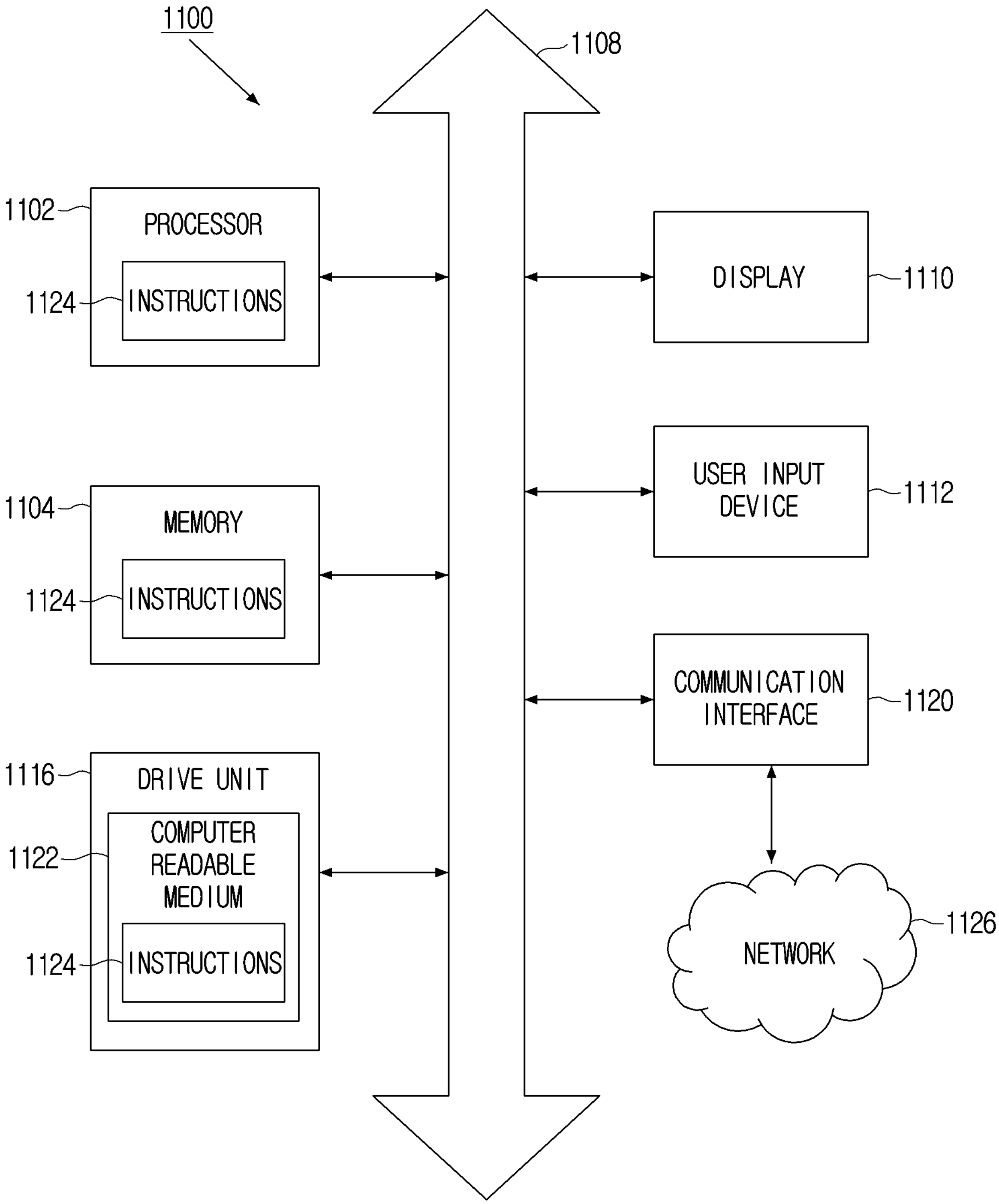
FIG. 11 illustrates another implementation in accordance with the embodiment of the disclosure, and yet another typical hardware configuration of the system 1000 in the form of a computer system 1100, according to an embodiment of the disclosure.

A general-purpose hardware and driver module 1003 corresponds to the computing device 1100 as referred in FIG. 11 and instantiates drivers for the general-purpose hardware units as well as the application-specific units (1002, 1012).

In an example, the ML mechanism underlying the architecture 1000 may be remotely accessible and cloud-based, thereby being remotely accessible through a network connection. An audio/video processing device may be configured for remotely accessing the NLP/ML modules and simulation modules may comprise skeleton elements such as a microphone, a camera a screen/monitor, a speaker, etc.

Further, at least one of the plurality of modules of the mesh network may be implemented through AI based on an ML/NLP logic 1006. A function associated with AI may be performed through the non-volatile memory, the volatile memory, and the processor constituting the first hardware module 1002, i.e., specialized hardware for ML/NLP based mechanisms. The processor may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The aforesaid processors collectively correspond to the processor 1102 of FIG. 11.

One or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning logic/technique to a plurality of learning data, a predefined operating rule or AI model of the desired characteristic is made. "Obtained by training" means that a predefined operation rule or artificial intelligence model configured to perform the desired feature (or purpose) is obtained by training a basic artificial intelligence model with multiple pieces of training data by a training technique. The learning may be performed in a device (i.e., the architecture 1000 or the device 1000) itself in which AI according to an embodiment is performed, and/or may be implemented through a separate server/system."

The AI model may consist of a plurality of neural network layers. Each layer has a plurality of weight values and performs a neural network layer operation through calculation between a result of computation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The ML/NLP logic 1006 is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

Referring to FIG. 11, it illustrates another implementation according to an embodiment of the disclosure, and yet another typical hardware configuration of the system 1000 in the form of a computer system 1100, according to an embodiment of the disclosure. The computer system 1100 can include a set of instructions that can be executed to cause the computer system 1100 to perform any one or more of the methods disclosed. The computer system 1100 may operate as a standalone device or may be connected, e.g., using a network, to other computer systems or peripheral devices.

In a networked deployment, the computer system 1100 may operate in the capacity of a server or as a client user computer in a server-client user network environment, or as a peer computer system in a peer-to-peer (or distributed) network environment. The computer system 1100 can also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 1100 is illustrated, the term "system" shall also be taken to include any collection of systems or sub-systems that individually or jointly execute a set, or multiple sets, of instructions to perform one or more computer functions.

The computer system 1100 may include a processor 1102 e.g., a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application-specific integrated circuits, field-programmable gate arrays, servers, networks, digital circuits, analog circuits, combinations thereof, or other now known or later developed devices for analyzing and processing data. The processor 1102 may implement a software program, such as code generated manually (i.e., programmed).

The computer system 1100 may include a memory 1104, such as a memory 1104 that can communicate via a bus 1108. The memory 1104 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 1104 includes a cache or random access memory for the processor 1102. In alternative examples, the memory 1104 is separate from the processor 1102, such as a cache memory of a processor, the system memory, or other memory. The memory 1104 may be an external storage device or database for storing data. The memory 1104 is operable to store instructions executable by the processor 1102. The functions, acts or tasks illustrated in the figures or described may be performed by the programmed processor 1102 for executing the instructions stored in the memory 1104. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 1100 may or may not further include a display unit 1110, such as a liquid crystal display (LCD), an organic light-emitting diode (OLED), a flat panel display, a solid-state display, a projector, a printer or other now known or later developed display device for outputting determined information. The display 1110 may act as an interface for the user to see the functioning of the processor 1102, or specifically as an interface with the software stored in the memory 1104 or the drive unit 1116.

Additionally, the computer system 1100 may include an input device 1112 configured to allow a user to interact with any of the components of system 1100. The computer system 1100 may also include a disk or optical drive unit 1116. The disk drive unit 1116 may include a computer-readable medium 1122 in which one or more sets of instructions 1124, e.g., software, can be embedded. Further, the instructions 1124 may embody one or more of the methods or logic as described. In a particular example, the instructions 1124 may reside completely, or at least partially, within the memory 1104 or within the processor 1102 during execution by the computer system 1100.

The disclosure contemplates a computer-readable medium that includes instructions 1124 or receives and executes instructions 1124 responsive to a propagated signal so that a device connected to a network 1126 can communicate voice, video, audio, images, or any other data over the network 1126. Further, instructions 1124 may be transmitted or received over the network 1126 via a communication port or interface 1120 or using a bus 1108. The communication port or interface 1120 may be a part of the processor 1102 or maybe a separate component. The communication port 1120 may be created in software or maybe a physical connection in hardware. The communication port 1120 may be configured to connect with a network 1126, external media, the display 1110, or any other components in system 1100, or combinations thereof. The connection with the network 1126 may be a physical connection, such as a wired Ethernet connection or may be established wirelessly as discussed later. Likewise, the additional connections with other components of the system 1100 may be physical or may be established wirelessly. The network 1126 may alternatively be directly connected to the bus 1108.

The network 1126 may include wired networks, wireless networks, Ethernet audio video bridging (AVB) networks, or combinations thereof. The wireless network may be a cellular telephone network, an 802.11, 802.16, 802.20, 802.1Q or WiMax network. Further, the network 1126 may be a public network, such as the Internet, a private network, such as an intranet, or combinations thereof, and may utilize a variety of networking protocols now available or later developed including, but not limited to transmission control protocol/internet protocol (TCP/IP) based networking protocols. The system is not limited to operation with any particular standards and protocols. For example, standards for Internet and other packet-switched network transmissions (e.g., TCP/IP, user date protocol/internet protocol (UDP/IP), hypertext markup language (HTML), and hypertext transfer protocol (HTTP)) may be used.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for mitigating unwanted audio noise in an Internet of things (IoT) based communication environment, the method comprising:

identifying and pairing, by a pairing module, one or more IoT devices with a voice assistant device in the IoT based communication environment based on an exchange of information between the one or more IoT devices and the voice assistant device;

dividing, by a clustering module using a gaussian mixture model, the one or more paired IoT devices into a plurality of clusters based on location information of the one or more IoT devices that are paired with the voice assistant device;

detecting, by the clustering module, a user's location with respect to a location of the voice assistant device based on at least one of sensors data associated with the one or more IoT devices or a time difference between an ultrasonic wave transmitted by the voice assistance device and an echo signal reflected from the user's body in response to the transmitted ultrasonic wave;

determining, by the clustering module, a cluster among the plurality of clusters corresponding to the user's location based on the detected user's location;

predicting, by a prediction module using a recurrent neural networks (RNN) model, an optimal sound output of the voice assistance device that is audible at the detected user's location based on sound information data; and correcting, by a correction module, the predicted optimal sound output of the voice assistance device based on a calculation of a sound parameter value corresponding to each IoT device of the determined cluster and a phase shift of the predicted optimal sound output using the calculated sound parameter value, wherein the predicted optimal sound output of the voice assistance device includes a plurality of acoustic parameters, wherein a first set of acoustic parameters among the plurality of acoustic parameters corresponds to frequency parameters including minimum frequency level, maximum frequency level, and mean frequency level of the predicted optimal sound output, wherein a second set of acoustic parameters among the plurality of acoustic parameters corresponds to intensity parameters including minimum intensity level, maximum intensity level, and mean intensity level of the predicted optimal sound output, wherein calculating the sound parameter value corresponding to each IoT device of the determined cluster comprises:

combining, by the correction module, the first set of acoustic parameters with the second set of acoustic parameters based on frequency bands of an audible range, and calculating, by the correction module, the sound parameter value based on the combination of the first set of acoustic parameters with the second set of acoustic parameters, and wherein correcting the predicted optimal sound output comprises:

selecting, by the correction module as a target IoT device, an IoT device from the determined cluster that has a minimum sound parameter value, shifting, by the correction module, a phase of the predicted optimal sound output based on the calculated sound parameter value and sound parameters of the selected IoT device, and generating, by the correction module, a new optimal sound corresponding to the determined cluster by merging the shifted phase optimal sound output with a desired sound of the voice assistant device.

2. The method of claim 1, wherein correcting the predicted optimal sound output further comprises:

outputting, by a rendering module, the generated new optimal sound from the target IoT device.

3. The method of claim 2, wherein each cluster of the plurality of clusters includes at least one IoT device, and wherein the phase of the predicted optimal sound output is shifted by 180°.

4. The method of claim 2, further comprising:

determining, by a processing module based on the corrected optimal sound output of the voice assistance device, an optimal region in the determined cluster or around the determined cluster where the generated new optimal sound is audible; and updating, by the processing module, settings of the voice assistance device based on the determined optimal region.

5. The method of claim 1, further comprising:

exchanging, by the pairing module in a pairing mode, the information between the one or more IoT devices and the voice assistant device, wherein the exchanged information includes location information of the one or more IoT devices, information associated with environmental noise around each IoT device of the one or more IoT devices, and the information associated with a perceived sound of the voice assistant device at each IoT device of the one or more IoT devices;

pairing, by the pairing module, the one or more IoT devices with the voice assistant device in the IoT based communication environment based on the exchanged information; and updating, by the pairing module, the exchanged information periodically based on a change in connection states of the one or more IoT devices with the voice assistant device.

6. The method of claim 1, wherein the sound information data includes at least one of information corresponding to a current sound output of the voice assistant device, information corresponding to environmental noise associated with the determined cluster, or information corresponding to a perceived sound of the voice assistant device at each IoT device of the one or more IoT devices.

7. A system for mitigating unwanted audio noise in an Internet of things (IoT) based communication environment, the system comprising:

a pairing module configured to identify and pair one or more IoT devices with a voice assistant device in the IoT based communication environment based on an exchange of information between the one or more IoT devices and the voice assistant device;

a clustering module configured to:

divide, using a gaussian mixture model, the one or more paired IoT devices into a plurality of clusters based on location information of the one or more IoT devices that are paired with the voice assistant device, detect a user's location with respect to a location of the voice assistant device based on at least one of sensors data associated with the one or more IoT devices or a time difference between an ultrasonic wave transmitted by the voice assistance device and an echo signal reflected from the user's body in response to the transmitted ultrasonic wave, and determine a cluster among the plurality of clusters corresponding to the user's location based on the detected user's location;

a prediction module configured to predict, using a recurrent neural networks (RNN) model, an optimal sound output of the voice assistance device that is audible at the detected user's location based on sound information data; and a correction module configured to correct the predicted optimal sound output of the voice assistance device based on a calculation of a sound parameter value corresponding to each IoT device of the determined cluster and a phase shift of the predicted optimal sound output using the calculated sound parameter value, wherein the predicted optimal sound output of the voice assistance device includes a plurality of acoustic parameters, wherein a first set of acoustic parameters among the plurality of acoustic parameters corresponds to frequency parameters including minimum frequency level, maximum frequency level, and mean frequency level of the predicted optimal sound output, and wherein a second set of acoustic parameters among the plurality of acoustic parameters corresponds to intensity parameters including minimum intensity level, maximum intensity level, and mean intensity level of the predicted optimal sound output, wherein, to calculate the sound parameter value corresponding to each IoT device of the determined cluster, the correction module is further configured to:

combine the first set of acoustic parameters with the second set of acoustic parameters based on frequency bands of an audible range; and calculate the sound parameter value based on the combination of the first set of acoustic parameters with the second set of acoustic parameters, and wherein to correct the predicted optimal sound output, the correction module is further configured to:

select, as a target IoT device, an IoT device from the determined cluster that has a minimum sound parameter value, shift a phase of the predicted optimal sound output based on the calculated sound parameter value and sound parameters of the selected IoT device, and generate a new optimal sound corresponding to the determined cluster by merging the shifted phase optimal sound output with a desired sound of the voice assistant device.

8. The system of claim 7, wherein the system further comprises a rendering module configured to output the generated new optimal sound from the target IoT device.

9. The system of claim 8, wherein each cluster of the plurality of clusters includes at least one IoT device, and wherein the phase of the predicted optimal sound output is shifted by 180°.

10. The system of claim 8, further comprising a processing module configured to:

determine, based on the corrected optimal sound output of the voice assistance device, an optimal region in the determined cluster or around the determined cluster where the generated new optimal sound is audible; and update settings of the voice assistance device based on the determined optimal region.

11. The system of claim 7, wherein the pairing module is further configured to:

exchange, in a pairing mode, the information between the one or more IoT devices and the voice assistant device, the exchanged information including location information of the one or more IoT devices, information associated with environmental noise around each IoT device of the one or more IoT devices, and the information associated with a perceived sound of the voice assistant device at each IoT device of the one or more IoT devices;

pair the one or more IoT devices with the voice assistant device in the IoT based communication environment based on the exchanged information; and update the exchanged information periodically based on a change in connection states of the one or more IoT devices with the voice assistant device.

12. The system of claim 7, wherein the sound information data includes at least one of information corresponding to a current sound output of the voice assistant device, information corresponding to environmental noise associated with the determined cluster, or information corresponding to a perceived sound of the voice assistant device at each IoT device of the one or more IoT devices.

* * * * *